W. J. KELLY.
METALLIC SEAL.
APPLICATION FILED FEB. 16, 1920.
1,397,101. Patented Nov. 15, 1921.
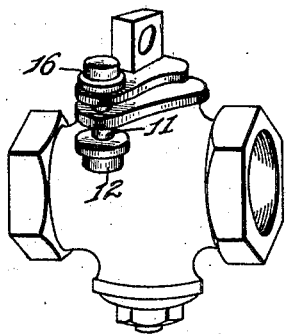
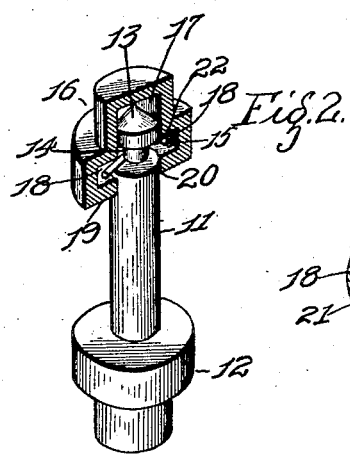
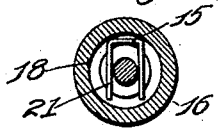
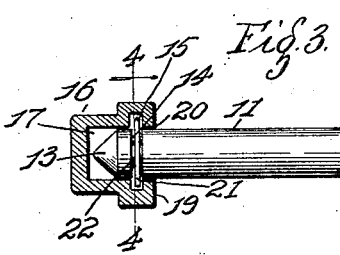
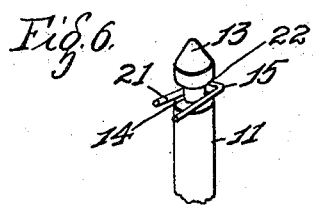
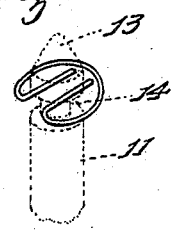
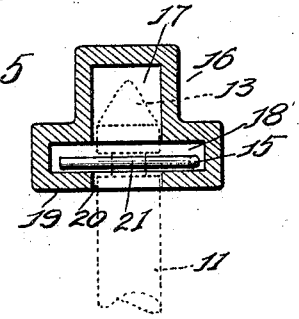
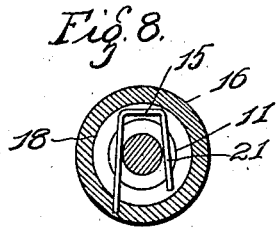
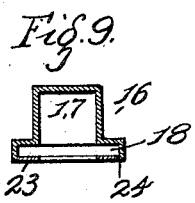
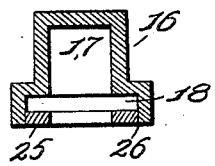
Inventor
Walter J. Kelly

UNITED STATES PATENT OFFICE.

WALTER J. KELLY, OF ST. LOUIS, MISSOURI.

METALLIC SEAL.

1,397,101.  Specification of Letters Patent.  Patented Nov. 15, 1921.

Application filed February 16, 1920. Serial No. 359,096.

*To all whom it may concern:*

Be it known that I, WALTER J. KELLY, a citizen of the United States, and resident of St. Louis, Missouri, have invented certain new and useful Improvements in a Metallic Seal, of which the following is a specification.

This invention relates to improvements in a metallic seal, the same being used in connection with locking meters of the gas or other type, said seal being so constructed that when once applied it will be necessary to destroy the locking cap in order to disconnect the seal from the meter.

A further object of my invention is to construct a seal consisting of a headed shank the one end of the shank provided with a conical head and a recess located beneath the head and a cap provided with a spring clip adapted to be placed over the head and to be locked in position thereon, and in order to remove the same, said cap must be broken.

Figure 1, is a perspective view of a valve used in connection with meters showing my invention in position thereon.

Fig. 2, is a sectional perspective view of my invention in locked position.

Fig. 3, is a side view of my improved lock showing the cap in section.

Fig. 4, is a cross sectional view taken on the line 4—4 of Fig. 3.

Fig. 5, is a sectional view of the cap showing its construction and the position assumed by the spring clip.

Fig. 6, is a detail perspective view of the locking pin showing the clip in the locked position thereon.

Fig. 7, is a detail perspective view of a modified form of spring clip which may be made use of.

Fig. 8, is a cross sectional view of the cap showing another method of supporting the spring clip in position.

Fig. 9, is a sectional view of a modified form of cap, constructing the same out of sheet metal.

Fig. 10, is a sectional view of a modified form of cap showing the same constructed of cast metal and of two pieces.

In the general construction of my improved seal I provide a seal constructed of a shank 11 provided with a head 12, this head may be made integral with the shank or originally attached thereto but must be so arranged as to be un-removable when applied thereon. The opposite end of the shank is provided with a conical head 13 and on the shank beneath the head is formed a depression or groove 14 which is constructed by cutting away a portion of the shank. This groove is for the purpose of receiving the spring clip 15 which is located in the locking cap 16.

The locking cap 16 is constructed of any desirable design but has a recess 17 which receives the conical head 13 of the shank and in the cap radiating from the recess 17 is formed a cavity 18 which is of larger diameter than the recess 17 and in this cavity is supported the spring clip 15, the bottom surface 19 of the cap is provided with an opening 20 of a size to accommodate the insertion of the head of the shank, and acts as a support to keep the cap straight and rigid on the shank when locked thereon. The spring clip 15 is placed in the cavity during the molding process and is so shaped that when the conical head of the shank is inserted through the opening 20 it spreads the side members 21 of the clip allowing it to pass over the conical head and then spring into the cavity 14 of the shank thereby locking the cap in position and then it comes in contact with the shoulder 22 of the head thereby preventing the shank from being withdrawn from the cap when once placed in position.

In some instances I may use a clip as that shown in Fig. 7, the same being of spring material and the head being inserted between the parallel members in the manner as that shown by dotted lines in Fig. 7.

The position of the cavities in the cap is such that the periphery of the shank 11 as well as the head will contact with the inner periphery of the cavity 17 and opening 20 thereby preventing the cap from wabbling when once attached.

After the same has been put in position on the valve of the meter as that shown in Fig. 1, the gas supply is then shut off and in order to open the valve it becomes necessary to remove the seal. To do this the cap 16 must be removed from the shank, this can only be done by breaking the cap and then removing the shank.

The principle and general purpose of the seal is to dispense with the use of pad-locks which necessarily must be operated by keys. This seal when it is desired to lock a meter is quickly and readily inserted in position as shown in Fig. 1, and the cap placed thereon, then the valve cannot in any way be tampered with unless the cap is broken and then that will be an indication that the valve and meter has been illegally tampered with.

In constructing the cap I may make the same out of sheet metal as shown in Fig. 9, in that instance the cap portion is first stamped out of sheet metal then a ring 23 placed in position and the joining edge 24 welded or otherwise fastened in position. And as shown in Fig. 10, the cap portion may first be cast and the ring 25 placed in position and its joining edge 26 welded, brazed or otherwise attached in position.

The specific or principal feature of my invention is to construct a cap having concealed therein a spring clip which will spread sufficiently when a headed shank or bolt is inserted therein and then close beneath the head so as to lock the shank in the cap and prevent the same from becoming detached except only by breaking off the cap.

Having fully described my invention what I claim is:

1. A seal of the character described comprising a shank, a head mounted on one end thereof, a locking head formed on the opposite end of the shank by forming a recess on the periphery of the shank, the free end of the locking head being conical in form, a cap having a recess for the reception of the locking head and a recess of larger diameter formed in the bottom of the cap and a locking spring located in horizontal position in the large recess and arranged to spread and then engage with the under side of the locking head to prevent the head from being detached after once locked in position, substantially as specified.

2. A seal of the character described comprising a cap having an elongated vertical cavity, a horizontal cavity of larger diameter formed in the bottom of the cap, a wire locking spring horizontally located in the horizontal cavity, a pin having a conical head adapted to be inserted in the vertical cavity, a depression formed under the head for the reception of the horizontal spring, said spring arranged to permit its sides to spread during the insertion of the pin and readjust themselves in the depression under the head, substantially as specified.

In testimony whereof I have signed my name to this specification, in presence of two subscribing witnesses.

WALTER J. KELLY.

Witnesses:
ALFRED A. EICKS,
B. AUSTINE.